United States Patent [19]

Watt

[11] Patent Number: 4,620,235
[45] Date of Patent: Oct. 28, 1986

[54] DISC FILM SCANNING APPARATUS

[75] Inventor: Peter B. Watt, Welwyn Garden, England

[73] Assignee: Eastman Kodak Company, Rochester, N.Y.

[21] Appl. No.: 653,266

[22] PCT Filed: Jun. 25, 1984

[86] PCT No.: PCT/GB84/00223

§ 371 Date: Sep. 19, 1984

§ 102(e) Date: Sep. 19, 1984

[87] PCT Pub. No.: WO85/00490

PCT Pub. Date: Jan. 31, 1985

[30] Foreign Application Priority Data

Jul. 6, 1983 [GB] United Kingdom ............ 8318278

[51] Int. Cl.$^4$ .................................. H04N 1/04
[52] U.S. Cl. ........................... 358/293; 350/6.4
[58] Field of Search ............ 358/293, 285, 292, 214, 358/215, 216; 350/6.4, 6.5, 500, 539, 274, 275, 202

[56] References Cited

U.S. PATENT DOCUMENTS

| 3,441,334 | 4/1969 | Marks et al. | 350/7 |
| 3,442,575 | 5/1969 | Rosin | 350/202 |
| 3,647,961 | 3/1972 | Blitchington, Jr. et al. | 178/7.85 |
| 3,715,497 | 2/1973 | Cooper et al. | 178/6.8 |
| 4,094,576 | 6/1978 | Heiling | 350/3.71 |
| 4,144,542 | 3/1979 | Preuss | 358/9 |

FOREIGN PATENT DOCUMENTS 1299525 6/1962 France .
4167233 7/1981 Japan .

Primary Examiner—Gene Z. Rubinson
Assistant Examiner—L. C. Schroeder
Attorney, Agent, or Firm—Raymond L. Owens

[57] ABSTRACT

A method of and apparatus for scanning annularly arranged images on a disc film arranged for rotation about its axis so as to present sequentially the images at a scanning station, is provided.

To correct for keystone distortion of a scanned image, a dove prism or equivalent mirror box is located on the optical axis and is rotated about such axis at half the speed of rotation of the disc.

8 Claims, 7 Drawing Figures

NEAR START OF PAGE SCAN

NEAR END OF PAGE SCAN

DISC FILM SCANNING APPARATUS

This invention relates to a scanning apparatus designed for scanning disc films. Disc films comprise a substantially circular disc of film with a hub or core whereby the disc may be mounted in appropriate apparatus for printing etc. It is convenient to rotate the disc to present, successively, annularly located sequential rectangular image areas on the film disc at, for example, a scanning or printing station.

Scanning or printing stations for film are known in which the film is moved in a first direction to effect "page" scan and is illuminated so as to provide point by point or line scanning in a direction perpendicular to the direction of page scan. When the film is in strip form, for example, 35 mm or 110 size film, the movements in the "page" scan direction is rectilinear. If the individual image areas are located on an annulus of the disc and the disc is rotated to provide page scan, the movement of each rectangular image area is angular and not rectilinear. This gives rise to a dynamic distortion similar in appearance to the static optically produced "keystone" distortion, as a radially innermost part of each rectangular image area moves a lesser distance than the radial outermost portion thereof.

It is known in the prior art to provide a rotating image of a stationary object by using what is known as a "dove" prism. An example of such a dove prism is to be found in U.S. specification No. 3 647 961.

The present invention has for its object the provision of a scanning apparatus and a scanning method in which a rotatably-mounted disc film can be scanned line by line whilst avoiding the keystone distortion which would normally be induced by rotation of the disc. The invention also provides a method of scanning a rectangular image area of a rotatable disc film, line by line without inducing rotationally-dependent distortion such as keystone distortion.

According to the present invention, there is provided a method of effecting line by line scanning of a rectangular image area of a plurality of such areas located annularly on a rotatable disc film, the method comprising the steps of indexing the disc about its axis to present the first of such areas at a scanning station, forming an image of a line of the rectangular image area on a linear CCD array in the scanning station, and moving the image so formed in a direction perpendicular to the linear CCD array to present images of successive lines of the rectangular image area on the CCD array.

The disc is rotated about its axis and optical means are arranged to correct the angular motion of the image of the rectangular image area to rectilinear motion perpendicular to the array.

In a preferred embodiment, the image is formed by an objective lens. The optical means comprises a dove prism or equivalent mirror box (hereinafter termed generally a "dove prism" for the sake of convenience) located on the optical axis of and at one side of the objective lens. The dove prism is rotated in the same sense as and at half the angular speed of rotation of the disc. It is preferred that, upon completion of the scan of each rectangular image area, the dove prism is returned to a start position whilst the disc is rotated further about its axis to present a next rectangular image area at the scanning station.

The CCD array is made longer than the image of a line to compensate for movement of the image parallel to the array.

The invention also provides an apparatus for line by line scanning disc films the apparatus comprising a scanning station, means for line scanning of an image annularly arranged in the disc at the scanning station, optical means for imaging the line scan on a CCD array, a dove prism or equivalent mirror box located on the optical axis, and means for rotating the disc about its axis and for rotating, at half speed, the dove prism about the optical axis.

The invention will be described further, by way of example, with referene to the accompanying drawings in which.

Figure 1:
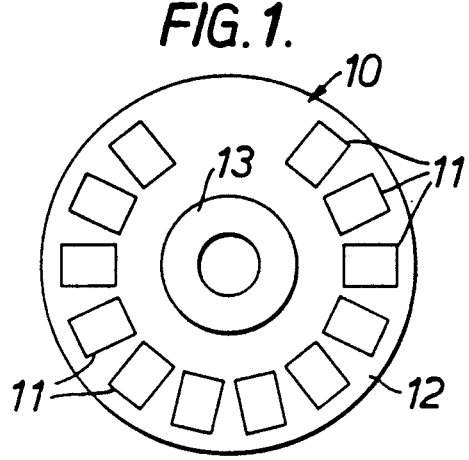
FIG. 1 is a plan view of a film disc of the kind which can be scanned without distortion, by the scanning apparatus of the present invention.
Figure 2A:
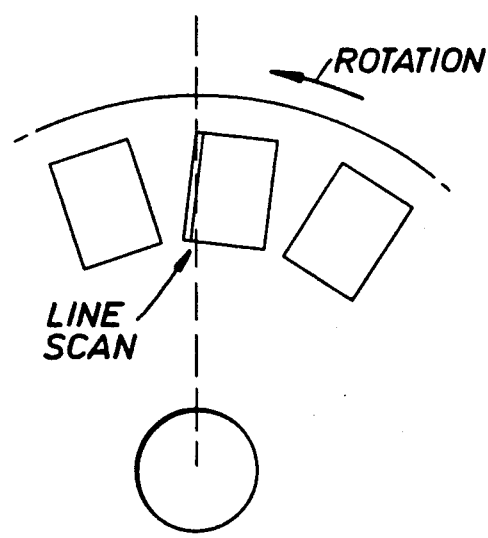
FIGS. 2a and 2b are diagrammatic illustrations to an enlarged scale of the distortion which is normally produced when a rectangular image area is rotated instead of being moved rectilinearly during scanning.
Figure 2B:
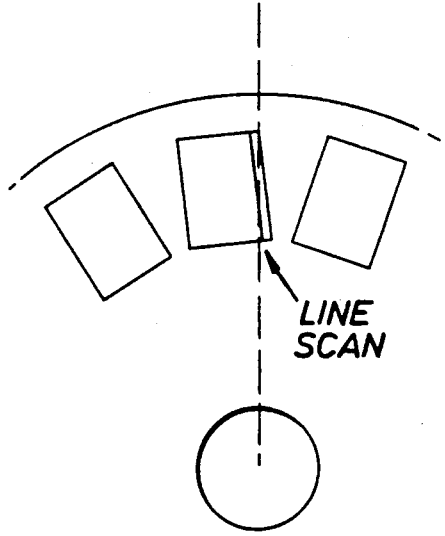

Referring to the drawings, there is shown in FIG. 1 a plan of a view of a disc film 10 which is to be scanned so as to analyse the image content sequentially of a plurality of rectangular image areas 11 located at equal intervals on an annulus of the disc. The disc 10 comprises a substantially circular portion of film 12 and a core 13 which enables the disc to be handled and to be rotated in an appropriate scanning apparatus. If such a disc of film were to be scanned to provide for image analysis using rotation of the disc 10 to provide for page scan then, as can be seen from FIGS. 2a and 2b, the line scan would only coincide with a line of the image area parallel to the edge thereof centrally of the image area. Adjacent to start of the image area and adjacent the end of the image area, the direction of the line scan is at an angle to the indicated desired line scan at leading and trailing edges of the rectangular image area. This gives rise to a dynamic distortion similar to the optical distortion known as keystone distortion, if the analysed image is reproduced.

Figure 3:
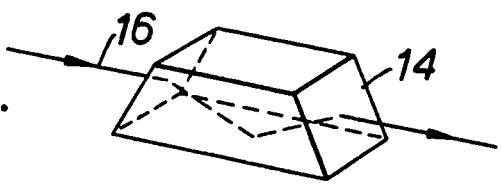
FIG. 3 is a perspective view of a dove prism.

A known optical element called a dove prism 14 is shown in FIG. 3. Such an element when rotated about its optical axis 16 rotates an image produced by light passing therethrough at twice the speed of its own speed of rotation.

Figure 4:
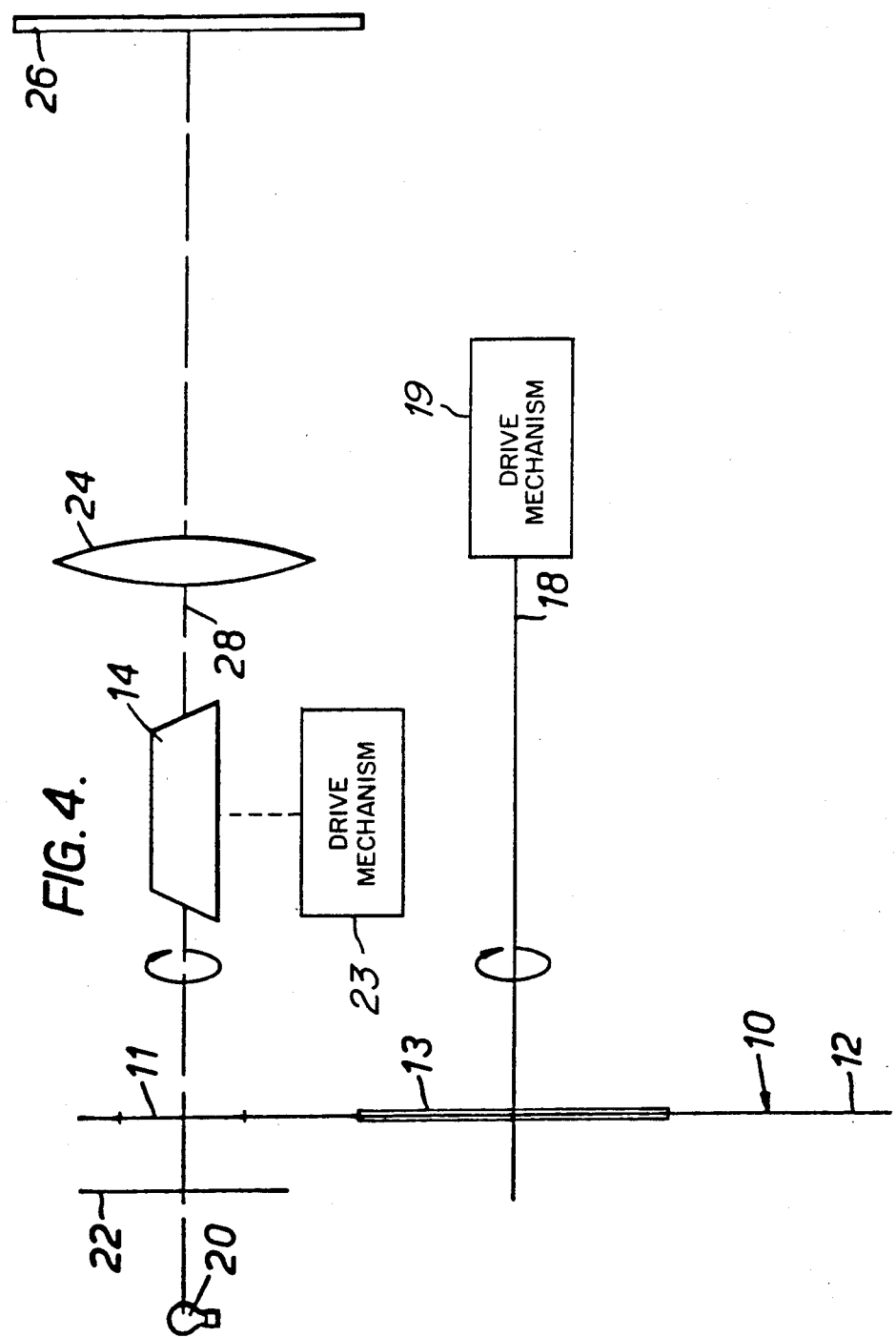
FIG. 4 is a diagrammatic view of a scanning apparatus of the present invention.

FIG. 4 shows diagrammatically a scanning apparatus according to the present invention. A disc film 10 is mounted for rotation about an axis 18 by a drive mechanism 19 so as to present its rectangular image areas 11 successively at a scanning station. A source of illumination 20 illuminates a line of the rectangular image area by slit means 22. The line of the image area so illuminated is wider than that to be analysed. This ensures that the desired line, parallel to the edges of the rectangular image area is illuminated even though, at the image area leading and trailing edges, it is at an angle to the line of light. Light from the "wide" illuminated line of the image area is passed through a dove prism 14 and the desired line rotated into parallelism, after passing through an objective lens 24, with a linear CCD array 26 to provide successive line by line scans of the image area of the disc film 10 upon rotation of the latter. The dove prism 14 is mounted for rotation about an axis parallel to the optical axis of the optical system by a drive mechanism 23 at the scanning station in the same sense as the rotation of the disc film about its axis 18 but at half the angular speed of rotation of the disc film.

The above-described arrangement, as shown in FIG. 4, is utilised where the magnification of the scanned line of the image area 11 is less than unity. If the magnification is greater than unity, the position of the lens 24 and the dove prism 14 are interchanged. In this way the dove prism is situated in the long conjugate of the lens whereby aberrations are minimised.

The mechanisms for rotating the disc 10 and the dove prism 14 may be synchronised so that continuous rotation of the disc and the prism is effected. The synchronisation should be such that, at the start of each scan, the prism is in the same start position. Alternatively, at the end of the scan of each image area, and whilst the disc 10 is being rotated to present a next image area, the dove prism may be disengaged from the drive and rotated back to its start position. The dove prism 14 may be located at either side of the objective lens 24 as is most convenient.

Figure 6:
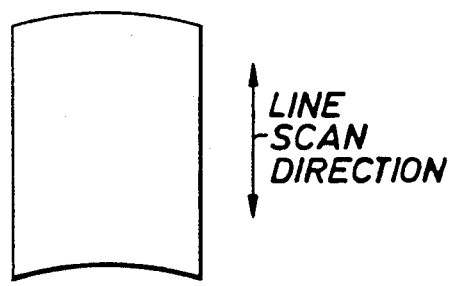
FIG. 6 is a representation of the image produced using apparatus according to the invention showing residual linear displacement of parts of the image.
Figure 7:
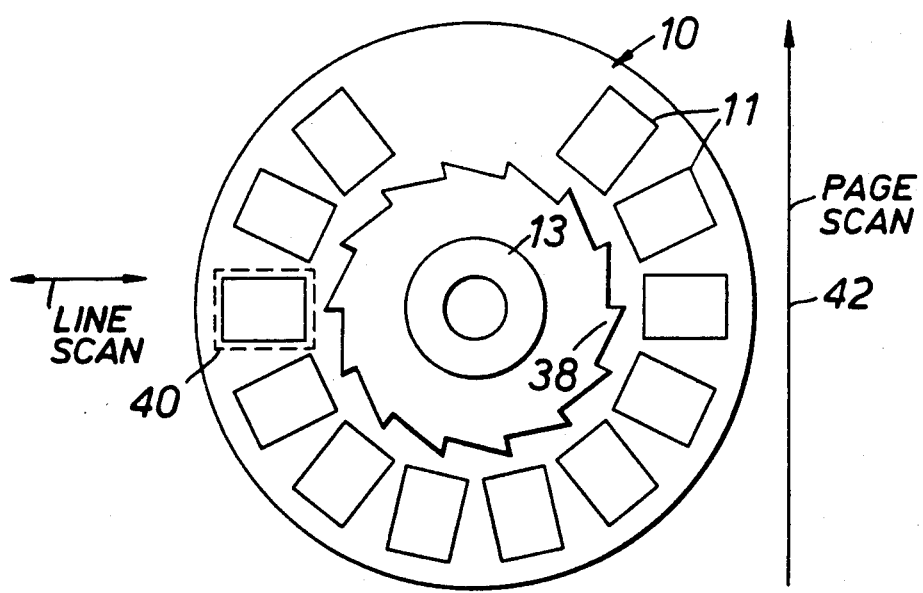

As shown in FIG. 6 the effect of using a dove prism is to remove totally keystone distortion and each line scan then falls within and lies parallel to the sides of the image formed by the scanning apparatus. However, a slight linear displacement of each successive line takes place in the direction of the line scan giving rise to curved edges at the lower and upper edges of the image as shown in FIG. 6. To cater for this, the liner CCD array 26 is made longer than necessary and appropriate electronic means are used to derive the electrical signals for each light scan from the appropriate CCDs which match the instantaneous location of the line image.

Figure 5:
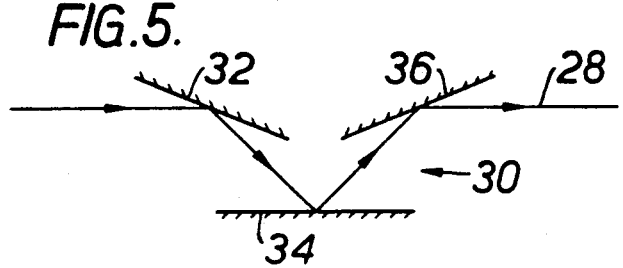
FIG. 5 is a diagrammatic view of a mirror box which can be used instead of a dove prism in the apparatus of the present invention.

Certain other optical aberrations, e.g. chromatic aberrations, are introduced utilising a dove prism. If necessary these can be overcome by using, instead of the dove prism, an equivalent mirror box 30 as shown in FIG. 5. The mirror box 30 comprises three opposed surface-silvered mirrors 32, 34 and 36 arranged for rotation about the axis 28 of the system thereby to provide an equivalent effect to the rotating dove prism.

Aberrations normally induced by using a dove prism can be totally overcome if the dove prism is used in conjunction with two lens, one situated at each side of the dove prism along the optical axis, the ratio of the focal length being the required magnification of the scanned line. The first lens is positioned at a distance from the disc equal to its focal length and the second lens, after the dove prism, is positioned at a distance from the CCD array equal to its focal length. All rays of light passing through the dove prism are then parallel to the optical axis and distortions and/or aberrations normally induced by the dove prism are eliminated.

An example of the light source 20 which may be used for illumination of the image area is to be found in the use of one or more lasers and a rotating mirror drum to provide the line scan. Movement of the disc as a whole then provides the page scan. Keystone distortion is thereby avoided.

In such a system, providing for rotational displacement of the disc, the dove prism would have to be located betweeen the rotating mirror drum and the rectangular image area of the negative. Electronic compensation for any residual raster could then be effected.

I claim:

1. A method of effecting line by line scanning of a rectangular image area of a plurality of such areas located annularly on a rotatable disc film, the method comprising the steps of:
    (a) indexing the disc about its axis to present the first of such areas at a scanning station,
    (b) forming an image of a line of the rectangular image area on a linear CCD array in the scanning station, and
    (c) moving the image so formed in a direction perpendicular to the linear CCD array to present images of successive lines of the rectangular image area on the CCD array.

2. A method as claimed in claim 1 wherein the disc is rotated about its axis and optical means are arranged to correct the angular motion of the image of the rectangular image area to rectilinear motion perpendicular to the array.

3. A method as claimed in claim 2 wherein the image is formed by an objective lens and the optical means comprises a dove prism or equivalent mirror box located on the optical axis and at one side of the objective lens.

4. A method as claimed in claim 3 wherein the dove prism or equivalent mirror box is rotated in the same sense as and at half the angular speed of rotation of the disc.

5. A method as claimed in claim 3 or 4 wherein, upon completion of the scan of each rectangular image area, the dove prism or equivalent mirror box is returned to a start position whilst the disc is rotated further about its axis to present a next rectangular image area at the scanning station.

6. A method as claimed in claim 1 wherein the CCD array is longer than the image of a line.

7. An apparatus for line by line scanning disc films, the apparatus comprising a scanning station, means for line by line scanning of an image annularly arranged on the disc at the scanning station, optical means for imaging the line scan on a CCD array, a dove prism or equivalent mirror box located on the optical axis, and means for rotating the disc about its axis and for rotating, at half speed, the dove prism about the optical axis.

8. An apparatus as claimed in claim 7 further including a CCD array longer in length than the length of the image of a scanned line.

* * * * *